E. ERICKSON.
HOLDING DEVICE.
APPLICATION FILED DEC. 18, 1911.

1,037,882.

Patented Sept. 10, 1912.

WITNESSES
M. S. Crozier.
J. Murphy

INVENTOR
Edward Erickson
By Jas. H. Churchill

UNITED STATES PATENT OFFICE.

EDWARD ERICKSON, OF BEVERLY, MASSACHUSETTS.

HOLDING DEVICE.

1,037,882.

Specification of Letters Patent. Patented Sept. 10, 1912.

Application filed December 18, 1911. Serial No. 666,393.

*To all whom it may concern:*

Be it known that I, EDWARD ERICKSON, a citizen of the United States, residing in Beverly, county of Essex, and State of Massachusetts, have invented an Improvement in Holding Devices, of which the following description, in connection with the accompanying drawings, is a specification, like letters on the drawings representing like parts.

This invention relates to a holding device especially designed and adapted among other uses for holding eggs, and has for its object to provide a simple, inexpensive and efficient device with which boiled eggs may be lifted from the water in which they are boiled, without liability of burning the hand of the cook or other person, and so that the hot water may drain from the egg. The holding device is also constructed so as to avoid crushing the egg shell, and especially when the upper portion of the egg shell is removed. The holding device may be provided with a handle by which it can be held while applying it to the egg in the hot water, and said handle may be provided with a base to support the device upon the table. These and other features of this invention will be pointed out in the claim at the end of this specification.

Figure 1:
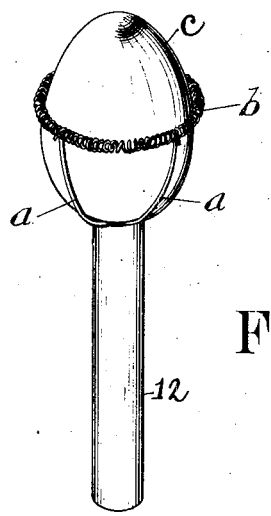
Figure 2:
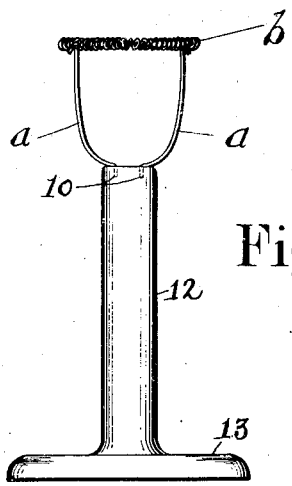

Figure 1 is an elevation of a holding device embodying this invention, and Fig. 2, an elevation of the device shown in Fig. 1 with the handle provided with a base.

Referring to the drawing, *b* represents a spiral spring having its opposite ends soldered or otherwise connected together, so as to form the gripping member of the holding device, which is preferably circular in form and is capable of expanding to receive the egg *c* or other article, and of contracting to grip the egg with sufficient force to insure its being held against accidental displacement from the holder.

The gripping member *b* is supported by a plurality of yielding arms *a*, herein shown as four in number and which are curved or bent so that their lower ends are brought substantially close together to form the body portion of a basket having a resilient rim member. The arms *a* may be made of wire and bent at their lower ends to form fingers 10 indicated by dotted lines in Fig. 2, which are pressed or driven into the end of a wooden or other non-metallic handle 12, which may be provided with a base 13 as shown in Fig. 2, or left without a base as shown in Fig. 1.

The gripping rim member *b* of the basket, is made of a diameter smaller than the thickest part of the egg or other article to be held, so as to be expanded by the egg when the latter passes into the basket and to engage the egg with a uniform grip or pressure about its circumference.

In operation, the operator grasps the handle 12 and inserts the basket into the hot water in the pan or vessel in which the egg is boiled, and forces the gripping member over the larger part of the egg, after which the holding device with the egg in the basket is lifted from the water and the water on the egg is allowed to drain into the vessel. The egg may be allowed to cool sufficiently to enable it to be handled, when the holder shown in Fig. 1 is used, or it may be set upon the table in an upright position when the handle is provided with a base as shown in Fig. 2.

It will be observed that the smaller end of the egg projects above or beyond the holder a sufficient distance to enable it to be removed by a knife without danger of the egg-shell being crushed, inasmuch as the lower part of the egg is firmly held for its entire circumference by the resilient rim of the basket. In the present instance, I have shown the rim of the basket as a spiral spring having its ends connected together, but it is not desired to limit the invention to this particular construction of resilient rim member for the basket.

I claim—

In a holding device of the character described, a basket for the reception of the article to be held having a rim member composed of a spiral spring, resilient arms to which said spring is secured substantially at the center of the bottom of the basket, and a handle to which said arms are secured, substantially as described.

In testimony whereof, I have signed my name to the specification in the presence of two subscribing witnesses.

EDWARD ERICKSON.

Witnesses:
 JAS. H. CHURCHILL,
 J. MURPHY.